US012573355B2

(12) United States Patent
Choi

(10) Patent No.: US 12,573,355 B2
(45) Date of Patent: Mar. 10, 2026

(54) DISPLAY DEVICE AND CONTROL METHOD THEREOF

(71) Applicant: SAMSUNG ELECTRONICS CO., LTD., Suwon-si (KR)

(72) Inventor: Hyunmook Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 432 days.

(21) Appl. No.: 18/103,619

(22) Filed: Jan. 31, 2023

(65) Prior Publication Data

US 2023/0169937 A1 Jun. 1, 2023

Related U.S. Application Data

(63) Continuation of application No. PCT/KR2021/007900, filed on Jun. 23, 2021.

(30) Foreign Application Priority Data

Aug. 10, 2020 (KR) ........................ 10-2020-0099749

(51) Int. Cl.
*G09G 5/22* (2006.01)
*G09G 3/20* (2006.01)
(Continued)

(52) U.S. Cl.
CPC ............... *G09G 5/227* (2013.01); *G09G 3/20* (2013.01); *G09G 5/14* (2013.01); *G09G 5/18* (2013.01);
(Continued)

(58) Field of Classification Search
CPC ............... G09G 5/227; G09G 2310/08; G09G 2340/0414; G09G 2340/0435; G09G 2354/00; G09G 2310/0213; G09G 2310/0221; G09G 2310/0232; G09G 2340/0471; G09G 2340/14; G09G 3/20;
(Continued)

(56) References Cited

U.S. PATENT DOCUMENTS 7,859,497 B2 12/2010 Kong et al.
7,952,552 B2 5/2011 Kong et al.
(Continued)

FOREIGN PATENT DOCUMENTS

JP 2001-282204 A 10/2001
JP 2007-298769 A 11/2007
(Continued)

OTHER PUBLICATIONS

Office Action issued by the Korean Patent Office on Jul. 16, 2024 for Korean Patent Application No. 10-2020-0099749.
(Continued)

*Primary Examiner* — Vijay Shankar
(74) *Attorney, Agent, or Firm* — STAAS & HALSEY LLP

(57) ABSTRACT

A method of controlling a display device may comprise: identifying a first area among all areas of a content displayable on a display; and scanning multiple pixel lines by multiple pixel lines in the first area and scanning one pixel line by one pixel line in a second area among all the areas of content which remain after excluding the first area, wherein at least one of a size and a position of the first area and a number of first areas is variable.

13 Claims, 16 Drawing Sheets

(51) Int. Cl.
*G09G 5/14* (2006.01)
*G09G 5/18* (2006.01)
*G09G 5/30* (2006.01)

(52) U.S. Cl.
CPC ........... *G09G 5/30* (2013.01); *G09G 2310/08* (2013.01); *G09G 2340/0414* (2013.01); *G09G 2340/0435* (2013.01); *G09G 2354/00* (2013.01)

(58) Field of Classification Search
CPC .. G09G 5/14; G09G 5/18; G09G 5/30; H04N 5/14; H04N 5/142
See application file for complete search history.

(56) References Cited

U.S. PATENT DOCUMENTS

| | | | |
|---|---|---|---|
| 9,582,188 | B2 | 2/2017 | Kim et al. |
| 9,952,711 | B2 | 4/2018 | Kim et al. |
| 10,504,442 | B2 | 12/2019 | Yoo |
| 11,037,477 | B2 | 6/2021 | Choi et al. |
| 11,386,866 | B2 | 7/2022 | Sin et al. |
| 11,442,587 | B2 * | 9/2022 | Song ..................... G06F 3/0448 |
| 11,812,164 | B2 * | 11/2023 | Yang .................... H04N 23/843 |
| 12,154,495 | B2 * | 11/2024 | Ma ....................... G09G 3/3266 |
| 12,217,697 | B2 * | 2/2025 | Guo ..................... G09G 3/3266 |
| 12,289,544 | B2 * | 4/2025 | Yang .................... H04N 25/133 |
| 2007/0057895 | A1 | 3/2007 | Kong et al. |
| 2010/0238203 | A1 | 9/2010 | Stroemer et al. |
| 2010/0315448 | A1 | 12/2010 | Kong et al. |
| 2011/0221798 | A1 | 9/2011 | Cummings |
| 2014/0306905 | A1 | 10/2014 | Kim et al. |
| 2016/0224176 | A1 | 8/2016 | Kim et al. |
| 2019/0005884 | A1 | 1/2019 | Yoo |
| 2020/0105177 | A1 | 4/2020 | Choi et al. |
| 2021/0225320 | A1 | 7/2021 | Sin et al. |
| 2021/0357079 | A1 * | 11/2021 | Song ..................... G06F 3/0412 |
| 2022/0189408 | A1 | 6/2022 | Jo et al. |
| 2023/0017746 | A1 * | 1/2023 | Yang .................... H04N 25/534 |
| 2025/0061842 | A1 * | 2/2025 | Lin ...................... G09G 3/3233 |
| 2025/0104589 | A1 * | 3/2025 | Jiang ..................... G11C 19/28 |

FOREIGN PATENT DOCUMENTS

| | | | |
|---|---|---|---|
| JP | 4535090 | B2 | 9/2010 |
| JP | 2012-182691 | A | 9/2012 |
| JP | 2021-013148 | A | 2/2021 |
| KR | 10-0529554 | B1 | 2/2006 |
| KR | 10-1182298 | B1 | 9/2012 |
| KR | 10-2013-0038231 | | 4/2013 |
| KR | 10-2014-0124278 | A | 10/2014 |
| KR | 10-2016-0019341 | A | 2/2016 |
| KR | 10-2016-0094114 | A | 8/2016 |
| KR | 10-2017-0012998 | A | 2/2017 |
| KR | 10-2019-0003334 | | 1/2019 |
| KR | 10-2020-0037530 | | 4/2020 |
| KR | 10-2021-0092571 | A | 7/2021 |
| KR | 10-2022-0006729 | A | 1/2022 |

OTHER PUBLICATIONS

International Search Report issued International Application No. PCT/KR2021/007900 dated Oct. 12, 2021.
Written Opinion issued in International Application No. PCT/KR2021/007900 dated Oct. 12, 2021.
Notice of Allowance issued Nov. 21, 2024 for International Application No. 10-2020-0099749.

* cited by examiner

DISPLAY DEVICE AND CONTROL METHOD THEREOF

CROSS-REFERENCE TO RELATED APPLICATION(S)

This application is a continuation application, under 35 U.S.C. § 111(a), of international application No. PCT/KR2021/007900, filed on Jun. 23, 2021, which claims priority to Korean Patent Application No. 10-2020-0099749, filed on Aug. 10, 2020, in the Korean Intellectual Property Office, the disclosures of which are incorporated by reference herein in their entirety.

BACKGROUND

Field

The disclosure relates to a display device having a screen varying scanning function and a control method thereof.

Description of Related Art

A related-art display operates in such a way to scan a screen at a constant rate in a line-by-line manner in accordance with a predetermined scanning rate of a panel. In the related-art, fast driving at a predetermined scanning rate or higher is impossible, and scanning is performed at a constant speed without distinguishing importance of a user with respect to a screen area, so that a user may be unsatisfactory in a situation in which a faster scanning rate such as game play is required.

SUMMARY

A display device according to an embodiment may include a display; and a processor configured to scan multiple pixel lines by multiple pixel lines in a first area among all areas of content displayable on the display, and scan one pixel line by one pixel line in a second area among all the areas of content which remain after excluding the first area.

At least one of a size, a position, and a number of the first area may be variable.

The processor may control the display to display a guide user interface (UI) to designate the first area, and control the display to change at least one of a size, a position, or a number of the first area according to a user manipulation input through the guide UI.

The processor may set at least one of a size, a position, or a number of the first area by analyzing features of a plurality of frames included in the content.

The features of a plurality of frames included in the content may include at least one of pixel information, motion information, or edge information by areas in each frame.

The processor may, based on at least one of pixel information, motion information, or edge information by areas in the first area being less than a threshold value, the first area is scanned by a unit of a plurality of first pixel lines, and based on at least one of pixel information, motion information, or edge information by areas in the first area being greater than or equal to a threshold value, the first area is scanned by a unit of a plurality of second pixel lines which is less than the plurality of first pixel lines.

The metadata related to the content may include area information defining at least one of a size, a position, or a number of the first area, and the processor may automatically set at least one of the size, the position, or the number of the first area based on the area information.

The metadata related to the content may include type information of the content, and the processor may automatically set at least one of a size, a position, or a number of the first area based on the type information of the content.

The first area may include an area comprising at least one of a preset type graphical user interface, on screen display, or an object, or an area comprising a script.

The display may include a plurality of pixel lines, and the processor may provide same data to at least two adjacent pixel lines among a plurality of pixel lines included in the first area.

The display may include a plurality of gate lines, a plurality of data lines, and a timing controller, and the processor may select two adjacent gate lines among the plurality of gate lines in the first area, and control the timing controller to provide same data to the two gate lines through the plurality of data lines.

A method of controlling a display device according to an embodiment includes identifying a first area among all areas of a content displayable on a display; and scanning multiple pixel lines by multiple pixel lines in the first area, and scanning one pixel line by one pixel line in a second area among all the areas of content which remain after excluding the first area.

At least one of a size, a position, and a number of the first area is variable.

The method may further include displaying a guide user interface (UI) to designate the first area; and changing at least one of a size, a position, or a number of the first area according to a user manipulation input through the guide UI.

The identifying the first area may include setting at least one of a size, a position, or a number of the first area by analyzing features of a plurality of frames included in the content.

The features of a plurality of frames included in the content may include at least one of pixel information, motion information, or edge information by areas in each frame.

The scanning may include, based on at least one of pixel information, motion information, or edge information by areas in the first area being less than a threshold value, the first area is scanned by a unit of a plurality of first pixel lines among the multiple pixel lines in the first area, and based on at least one of pixel information, motion information, or edge information by areas in the first area being greater than or equal to a threshold value, the first area is scanned by a unit of a plurality of second pixel lines among the multiple pixel lines in the first area which is less than the first pixel lines.

The metadata related to the content may include area information defining at least one of a size, a position, or a number of the first area, and the identifying the first area may include automatically setting at least one of the size, the position, or the number of the first area based on the area information.

The metadata related to the content may include type information of the content, and the processor may automatically set at least one of a size, a position, or a number of the first area based on the type information of the content.

The first area may include an area comprising at least one of a preset type graphical user interface, on screen display, or an object, or an area comprising a script.

The display may include a plurality of pixel lines, and the scanning may include providing same data to at least two adjacent pixel lines among a plurality of pixel lines included in the first area.

The display may include a plurality of gate lines, and the scanning may include selecting two adjacent gate lines among the plurality of gate lines in the first area, and providing same data to the two adjacent gate lines through the plurality of data lines.

BRIEF DESCRIPTION OF DRAWINGS

These and/or other aspects of the disclosure will become apparent and more readily appreciated from the following description of embodiments, taken in conjunction with the accompanying drawings of which.

DETAILED DESCRIPTION

Figure 1:
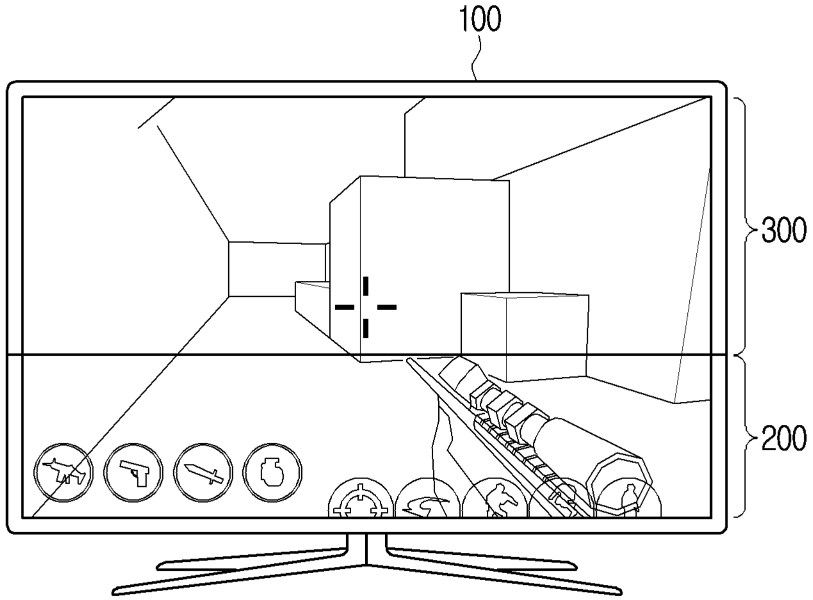
FIG. 1 is a diagram for describing an implementation example of a display device according to an embodiment of the disclosure.

The terms used herein will be described briefly.

General terms that are currently widely used were selected as terms used in embodiments of the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

As used herein, the terms "first," "second," or the like may identify corresponding components, and are used to distinguish a component from another without limiting the components.

The expression "At least one of A or/and B" should be understood to represent "A" or "B" or any one of "A and B".

In addition, the description in the disclosure that one element (e.g., a first element) is "(operatively or communicatively) coupled with/to" or "connected to" another element (e.g., a second element) should be interpreted to include both the case that the one element is directly coupled to the another element, and the case that the one element is coupled to the another element through still another element (e.g., a third element).

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Hereinafter, non-limiting example embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted, and similar portions will be denoted by similar reference numerals throughout the specification.

The disclosure provides an electronic device capable of increasing a screen switching speed by quickly scanning a partial area of a content screen than the remaining area, and a control method thereof.

According to various embodiments of the disclosure, content requiring rapid screen transition can be provided without loss of resolution.

FIG. 1 is a diagram for describing an implementation example of a display device according to an embodiment of the disclosure.

A display device 100 according to an embodiment of the disclosure may be implemented as an electronic device having a display such as a TV, a monitor, a laptop PC, a mobile phone, a personal digital assistant (PDA), a kiosk, a video wall, and the like, and may be implemented as various types of home appliances including a display (not shown) such as that of a refrigerator, a washing machine, an air conditioner, or the like.

The display device 100 may receive and display various types of content such as game content, movie content, home shopping content, drama content, virtual reality (VR) content, and the like. However, for convenience of description, a case in which the display device 100 receives and displays the game content will be described.

Recently, contents, particularly, graphic specifications, screen conversion rate, resolution, etc. of contents, particularly game contents, are increasing. However, since the scanning rate of the display device 100 is fixed, smooth game play may be restricted when the scanning rate of the display device is lower than the scanning rate of the game content.

FIG. 1 illustrates an example of game content, and as illustrated in FIG. 1, the display device 100 may display content including a plurality of frames. In particular, the display device 100 according to an embodiment of the disclosure may be driven at a constant scanning rate. The scanning rate may mean time and speed at which the display device 100 displays one frame. As an example, if the scanning rate of the display device 100 is 60 Hz, the display device 100 may scan the entire display area for 1/60s to display one frame.

The scanning rate may be referred to as a refresh rate, a driving frequency, or a frame rate, but is hereinafter referred to as a scanning rate for convenience of description.

The scanning rate of the display 110 may be expressed in Hz units. For example, when the scanning rate of the display is 60 Hz, the display device 100 may provide 60 frames per second. As another example, if the scanning rate of the display is 120 Hz, the display device 100 may provide 120 frames per second. Here, an example in which the scanning rate of the display is driven at 60 Hz and 120 Hz is merely an example, and the embodiment is not limited thereto. For example, the display may be driven at various scanning rates such as 75 Hz, 144 Hz, and 240 Hz.

According to an embodiment of the disclosure, when the scanning rate of the display device 100 is the same as the scanning rate of the content, the display device 100 may display some of the plurality of frames constituting the content without omitting some of the plurality of frames.

When the scanning rate of the content is relatively higher than the scanning rate of the display device, the related-art display device displays the content by omitting some frames. In this case, there is a problem that the content is not smoothly reproduced. As the simplest method for solving such a problem, there may be a method of improving the hardware specification of a display device. However, the display device has a problem of increasing manufacturing costs in order to display content having high scanning rate content, for example, a scanning rate of 120 Hz, without omitting a frame.

In general, the game content includes a main interested area 300 and a non-interested area 200 of the user. For example, the main interested area 300 may include main game contents, and the non-interested area 200 may include additional information related to the state information, the map information, the item information, and the other game operation of the character. In this case, fast screen switching and high resolution are required in the main interested area 300, and fast screen switching and high resolution may not be required in the non-interested area 200. Various contents including a fast motion area such as sports content, action movie content, and the like, as well as game content, may have similar characteristics.

The disclosure relates to a display device and a method for improving a scanning rate by performing scanning in units of a plurality of pixel lines in a non-interest area 200. Hereinafter, a non-interested area 200 is commonly referred to as a first area and a main interested area 300 as a second area.

Various embodiments capable of providing fast screen switching while maintaining the satisfaction of a user with respect to a content resolution based on the characteristics of the content screen will be described below.

Figure 2:
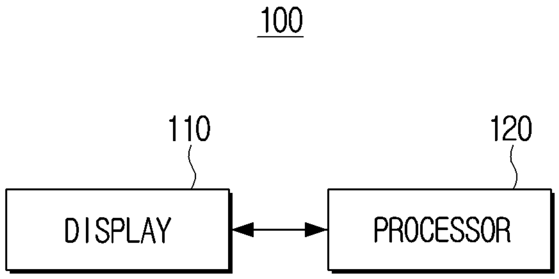
FIG. 2 is a block diagram illustrating a configuration of a display device according to an embodiment of the disclosure.

FIG. 2 is a block diagram illustrating a configuration of a display device according to an embodiment of the disclosure.

Referring to FIG. 2, the display device 100 may include a display 110 and a processor 120.

The display 110 is an element to display an image, various information, a menu, or the like. The display 110 may include a display for displaying various information, menu, or the like.

The display 110 may be implemented as a display of various types such as, for example, and without limitation, a liquid crystal display (LCD), organic light emitting diodes (OLED) display, quantum dot light-emitting diodes (QLED), plasma display panel (PDP) or the like. In the display 110, a backlight unit, a driving circuit which may be implemented as an a-si TFT, low temperature poly silicon (LTPS) TFT, organic TFT (OTFT), or the like, may be included as well. The display 110 may be implemented as a touch screen coupled to a touch sensor, a flexible display, a rollable display, a third-dimensional (3D) display, or the like.

A display according to an embodiment of the disclosure may include a plurality of pixels and display an image signal. For example, when the display 110 is implemented with 8K resolution, the display 110 may include a plurality of pixels of 7680Y4320. Alternatively, when the display 110 is implemented with a 4K resolution, the display 110 may include a plurality of pixels of 3840Y2160. However, the embodiment is not limited thereto, and the display may be implemented with various resolutions. In addition, the horizontal and vertical ratios of the display may also be changed.

Each of the plurality of pixels included in the display 110 may include sub-pixels representing red (R), green (G), and blue (B) pixels. As another example, a pixel may be composed of subpixels representing W in addition to RGB. However, the embodiment is not limited thereto, and each of the plurality of pixels may be implemented in various forms.

The display 110 may include a plurality of gate lines and a plurality of data lines. The gate line is a line for transmitting a scan signal or a gate signal, and the data line is a line for transmitting a data voltage. For example, each of the plurality of sub-pixels included in the display 110 may be connected to one gate line and one data line. In particular, each of the plurality of data lines may provide data to pixels in the same column. The display 110 may be a panel having a 1DIG stripe structure.

The display 110 may sequentially drive a plurality of gate lines or may simultaneously drive some of the plurality of gate lines. For example, the display 110 may simultaneously drive two adjacent gate lines among the plurality of gate lines. The display 110 may be any panel having a driving structure capable of simultaneously driving a plurality of gate lines.

A display according to an embodiment of the disclosure may include a touch sensor (not shown). The touch sensor may be manufactured separately from the display to be disposed on an upper portion or a lower portion of the display or may be implemented in a form embedded in the display. Because of including a touch sensor, the display may alternatively be referred to as a touch screen.

The processor 120 controls the overall operation of the display device 100. Specifically, the processor 120 may be connected to each component of the display device 100 to control overall operation of the display device 100. For example, the processor 120 may be connected to the display 110, a memory (not shown), an inputter (not shown), a user interface (not shown), an outputter (not shown), and the like to control the operation of the display device 100.

The processor 120 may include a scaler (not shown) and a timing controller (TCON, not shown), but be implemented as a separate component, and in this case, the processor 120 may be connected to a configuration such as a scaler, a timing controller, or the like to control the operation of the display device 100.

The timing controller (not shown) may receive from the outside, for example, the processor 120, an input signal (IS), horizontal synchronous signal (Hsync), vertical synchronous signal (Vsync), and main clock signal (MCLK), or the like, generate an image data signal, a scanning control signal, a data control signal, a light emitting control signal, or the like, and provide the same to the display panel 100.

According to an example embodiment, the processor 120 may be implemented as a digital signal processor (DSP), a microprocessor, a central processing unit (CPU), a micro controller unit (MCU), a micro processing unit (MPU), a controller, an application processor (AP), but herein it is recited as the processor 120. The processor 120 may be implemented as a System on Chip (SoC) or large scale integration (LSI) embedded with a processing algorithm, and may be implemented in the form of a field programmable gate array (FPGA).

The processor 120 may display a partial area of the content displayed on the display 110 and the remaining area at different scanning rates.

The processor 120 according to an embodiment may scan in a first area of the entire area of content displayed on the display 110 in units of a plurality of pixel lines, and scan in a second area excluding the first area in units of one pixel line. The first area may be an area including at least one of a preset type graphical user interface (GUI), on screen display (OSD), or an object, or an area including a script, but is not limited thereto.

At least one of the size, position, or number of the first area may be variable.

For example, a first area size, location, or number may be adjusted according to at least one of a user manipulation or a characteristic of the content. The processor 120 may scan the first area 200 at a faster rate than the second area 300, thereby increasing the overall scanning rate of the screen.

According to an embodiment, the processor 120 may control the display 110 to display a guide UI for designating a first area, and control the display 110 to change at least one of a size, a position, or a number of the first area according to a user operation input through the guide UI.

According to another embodiment, the processor 120 may analyze characteristics of a plurality of frames included in the content to set at least one of a size, a location, or a number of the first area. The first area is mainly formed at the upper end or the lower end, but may be formed on both the upper end and the lower end, and the size of the first area is not limited as long as the sum of the areas of the plurality of first areas is smaller than the area of the entire screen area.

The characteristics of a plurality of frames may include at least one of pixel information by areas, motion information, or edge information in each frame.

According to an embodiment, the processor 120 may set at least one of the size, position, or number of the first area based on pixel information by areas in each frame.

For example, when several pixels having the same data value are adjacent, the corresponding area is an area in which contents which are not required to be displayed at high resolution are displayed. The degree at which a pixel having the same data value is adjacent to each other is related to pixel information, and the processor 120 may set a first area around a portion identified as having a low pixel value on the basis of the pixel information.

According to another example, the processor 120 may set at least one of a size, a position, or a number of the first area on the basis of motion information for each area in each frame. There may be a portion without a change in the data value for a period of time, that is, there may be an area with no movement or a very slow area on the content. There is a high possibility that the area mainly indicates state information or has a UI in a fixed game. Therefore, even when the resolution is lowered with respect to the area, the user may not significantly recognize the deterioration of the image quality. The processor 120 may set a first area around the corresponding area.

According to a still another example, the processor 120 may set at least one of the size, position, and number of the first area based on edge information by areas in each frame.

Most of games includes an area having a horizontally elongated shape on a screen to display various menus, shortcut key buttons, character information, and the like on the top or bottom of a screen.

The processor 120 may identify edge information that this area is distinguished from another area on the screen and may set the first area based on the edge.

In the above embodiment, for convenience of description, a first area is set in consideration of each of pixel information, motion information, and edge information, but a first area may be set by combining at least two of pixel information, motion information, and edge information.

The processor 120 may scan the first area in units of a plurality of first pixel lines when at least one of pixel information, motion information, or edge information for each area in the first area is less than a threshold value, and may scan the first area in units of a plurality of second pixel lines smaller than the first pixel line when at least one of pixel information, motion information, or edge information for each area in the first area is greater than or equal to a threshold value.

As a result, the processor 120 may identify an area where the resolution is not important in the screen area, identify a reduction degree of resolution, and determine whether to display content by simultaneously driving how many gate lines are driven on the basis of the identified degree of reduction of resolution.

According to still another embodiment, the processor 120 may set a first area on the basis of metadata related to content. Here, the metadata related to the content includes area information defining at least one of a size, a location, or a number of the first area, and the processor 120 may automatically set at least one of a size, a location, or a number of the first area based on the area information.

The metadata related to content may be stored in a memory (not shown) included in the display device 100, but may be included in the received content. In this case, metadata included in the received content may be generated by a content producer and included in the content.

According to an embodiment, the processor 120 may automatically set a first area on the basis of type information included in metadata included in the received content. According to an embodiment of the disclosure, the memory (not shown) may store information on at least one of a size, a location, or a number of a first area according to the type of each content.

The type information of content may include information related to types of content such as movies, home shopping, drama, games, and the like. According to an embodiment, the processor 120 may set a 20% size area of a lower end of a screen as a first area when the type information of the content indicates game content. According to another example, the processor 120 may set the upper 20% size area and the lower 20% size area as the first area when the type information of the content indicates the home shopping content. However, this is merely an example, and the size, location, or number of the first area of the area according to the type information of the content may be variously set.

Figure 3A:
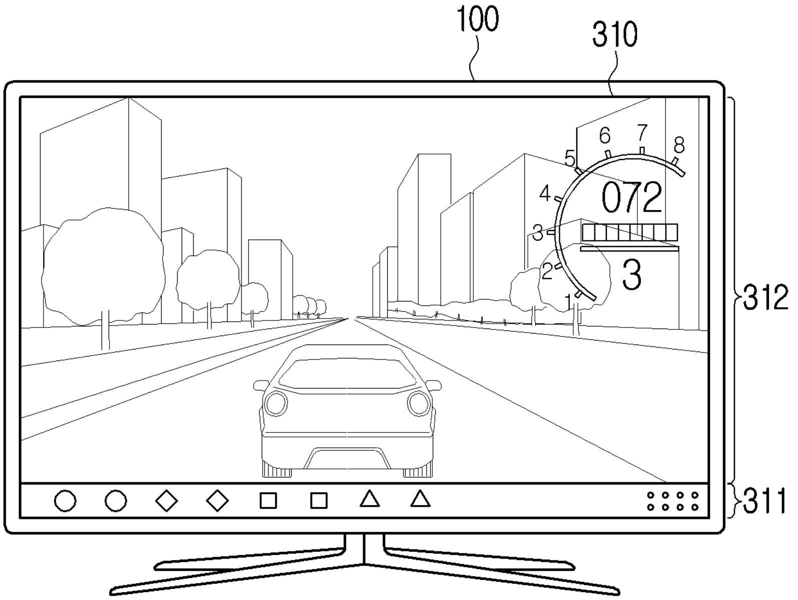
FIGS. 3A, 3B and 3C are diagrams for describing an area setting method according to an embodiment of the disclosure.
Figure 3B:
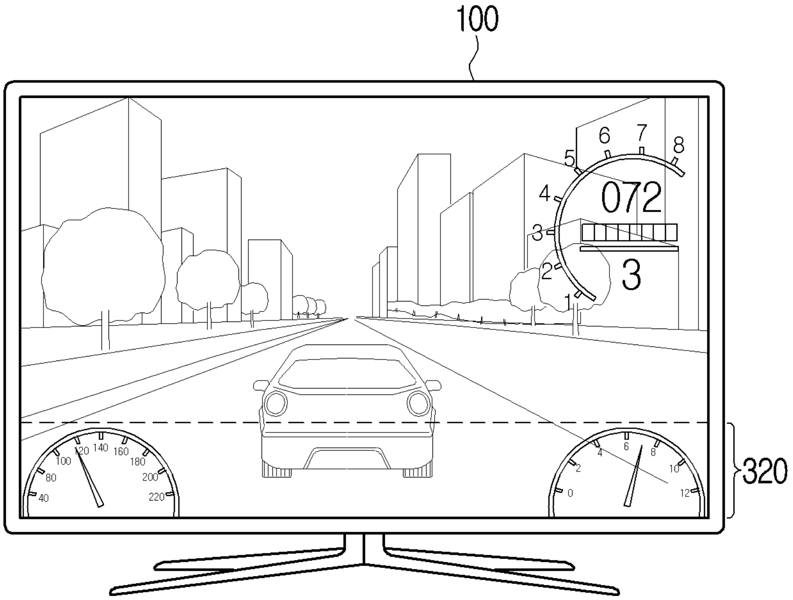
Figure 3C:
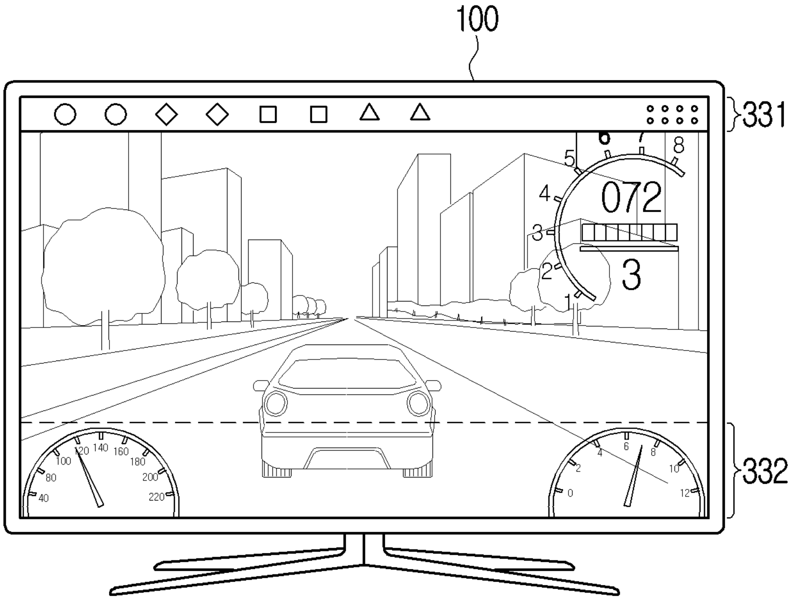

FIGS. 3A to 3C are diagrams to describe a method of setting an area according to an embodiment.

According to various embodiments of the disclosure, various types of contents may be provided through the display device 100, but in FIGS. 3A to 3C, it will be described that the game contents are provided.

According to an embodiment of the disclosure, the processor 120 may analyze game content to identify an interested area and a non-interested area for each of at least one frame section. According to an embodiment, the processor 120 may identify an interested area and a non-interested area for each frame, but according to another example, an interested area and a non-interested area may be identified for each scene. That is, when an interested area and a non-interested area are identified in a frame in which one scene starts, an identified interested area and a non-interested area may be maintained in every frame included in the scene section.

According to an example, as illustrated in FIG. 3A, an area in which specific edge information in an image is maintained is identified as a non-interested area 311, and the remaining area 312 is identified as a non-interested area. The reason for identifying the interested area and the non-interested area based on the edge information is because the user menu area is fixed without being variable in game content or the like.

The processor 120 may not identify the non-interested area and a user may set the non-interested area by her/himself.

The non-interested area 311 set by the processor 120 or a user corresponds to the first area 200 described in FIGS. 1 and 2, and the interested area 312 corresponds to the second area 300.

The processor 120 may scan a non-interested area 311 corresponding to the first area in units of a plurality of pixel lines to increase a scanning rate of the display device 100.

In a process in which an interested area 312 and a non-interested area 311 are identified in a game content screen 310 provided through the display device 100, the processor 120 may use the following method.

First, pixel information of a specific area is analyzed. The large number of games is designed to have a lower resolution than that of a portion where a game is played while a user plays a game, such as a GUI and an on-screen display (OSD). Since the non-interested area 311 described in FIG. 3A is provided to have a low resolution compared to the interested area 312 as described above, the processor 120 may analyze the pixel information of the non-interested area and set the analyzed pixel information as a first area.

Second, motion information of a specific area is analyzed. The non-interpolated area 311 has less variation in the data value of the pixels according to the frame transition compared to the interested area 312.

The processor 120 may analyze the motion information of the non-interested area and may set the non-interested area having smaller variation of data value according to the frame transition as the first area.

Finally, edge information of a specific area is analyzed. The non-interested area 311 may include a fixed edge that is separate from the interested area 312. Otherwise, the non-interested area 311 may include multiple icons with fixed edge lines.

The processor 120 may analyze edge information of the non-interested area 311 and may identify the non-interested area 311 as the first area.

According to an embodiment of the disclosure, it may be confirmed in FIG. 3B that a graphic representing information about a game is located at the lower end of the screen. In this case, a lower area 320 in which a graphic representing information about the game is located becomes a non-interested area in the user's viewpoint.

As the non-interested area 320 is not divided by the edge and the OSD in a gauge shape may continue to move, the most suitable information the processor 120 may consider may be pixel information.

The processor 120 may analyze pixel information and may set the area from the lower end of the screen to the area where the uppermost end of the non-interested area 320 as the first area.

The first area may be set to the range desired by the user.

FIG. 3C is a diagram for describing a game content including a plurality of non-interested areas.

According to an embodiment of the disclosure, as described with reference to FIGS. 3A and 3B, the processor 120 may analyze pixel information, motion information, and edge information to set a plurality of non-interested areas (331,332) as the first area, respectively.

Figure 4A:
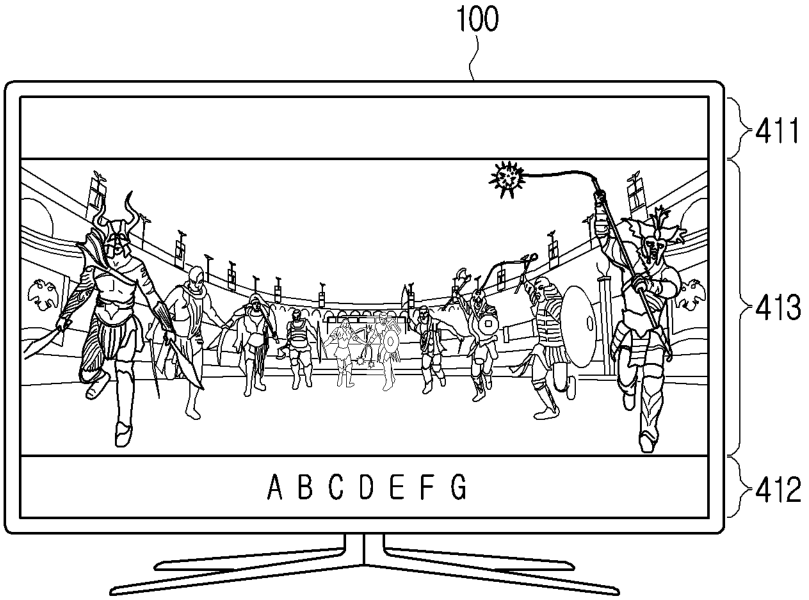
FIGS. 4A, 4B and 4C are diagrams for describing a method for setting an area for each content according to an embodiment of the disclosure.
Figure 4B:
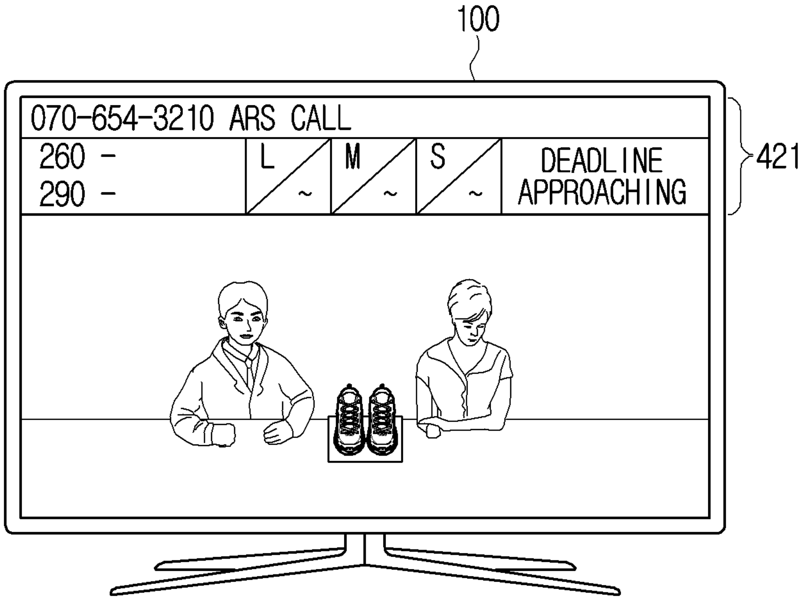
Figure 4C:
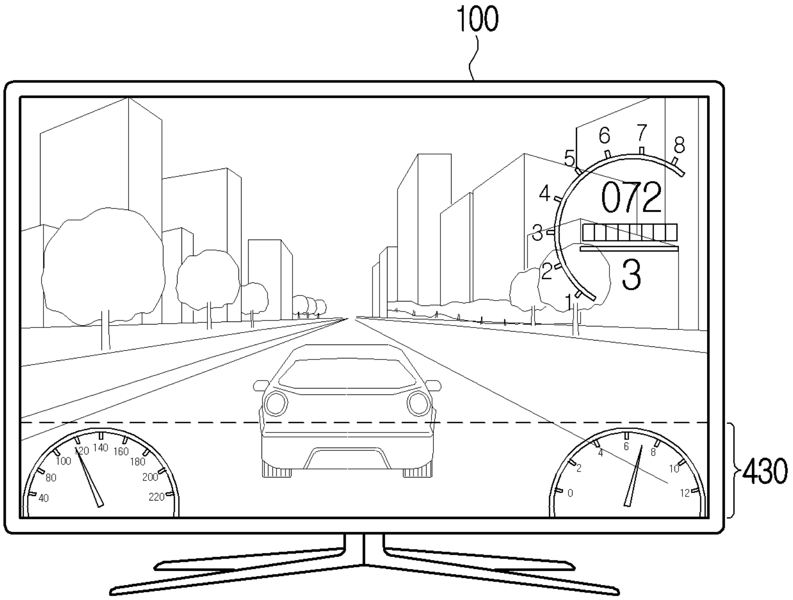

FIGS. 4A to 4C are diagrams for describing a method for setting an area for each content according to an embodiment of the disclosure.

According to FIGS. 4A to 4C, a non-interested area may be automatically set for each content type. For example, the processor 120 may set a non-interested area corresponding to a content type on the basis of content type information included in metadata received together with the content, and may scan for the corresponding portion in units of a plurality of pixel lines.

When setting the non-interested area by receiving metadata, the processor 120 may not analyze a frame and may set the non-interested area with only metadata.

According to an embodiment, a specific type of content, for example, movie content, may have an aspect ratio different from an aspect ratio of a display screen according to a content type.

In this case, the processor 120 may generate and display a frame including a black bar area 411 and a content reproduction area 413. Here, the black bar area 411 does not need to be displayed at the same resolution as the content reproduction area. Accordingly, the processor 120 may scan the black bar area 411 in units of a plurality of pixel lines.

According to an embodiment, a subtitle area 412 displaying a subtitle may be included in the screen according to the feature of a movie content.

Since a subtitle area 412 is an area in which a predetermined content is provided differently from the black bar area 411, the metadata corresponding to the movie content may include information on the subtitle area 412 and information different from each other with respect to the black bar area 411.

FIG. 4B is a diagram illustrating that the display device 100 provides home shopping content.

According to an embodiment of the disclosure, information on a product being sold, a residual quantity for each size, an ARS phone number, and other gifts guidance is displayed on an upper screen area 421. Although the information is not necessarily displayed on the upper end of the screen, it is assumed that various types of information are displayed in the upper area 421 in the drawings, for convenience.

The upper area 421 may correspond to a non-interested area, and the processor 120 may perform scanning in units of a plurality of pixel lines with respect to the non-interested area 421 on the basis of information (for example, metadata) on the corresponding area.

FIG. 4C is a diagram that the display device 100 provides game content.

In FIG. 4C, the lower area 430 of the game content screen may correspond to a non-interested area, and the processor 120 may perform scanning in units of a plurality of pixel lines with respect to the non-interested area 421 on the basis of information (for example, metadata) on the corresponding area.

Figure 5:
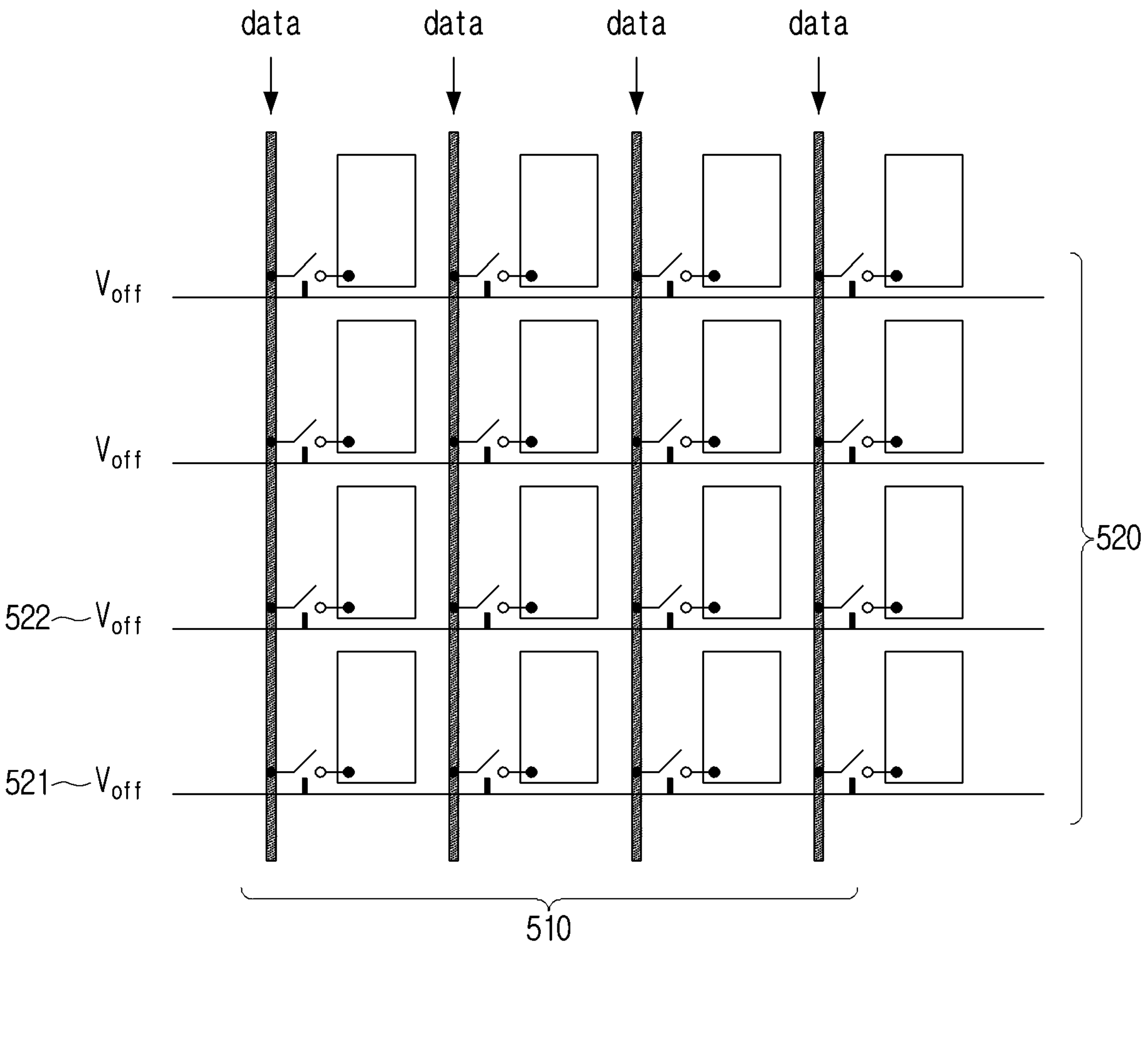
FIG. 5 is a diagram for describing a structure of a display according to an embodiment of the disclosure.

FIG. 5 is a diagram for describing a structure of a display according to an embodiment of the disclosure.

The display 110 may include a plurality of gate lines and a plurality of data lines. The gate line is a line for transmitting a scan signal or a gate signal, and the data line is a line for transmitting a data voltage. For example, each of the plurality of sub-pixels included in the display 110 may be connected to one gate line and one data line. In particular, each of the plurality of data lines may provide data to pixels in the same column. The display 110 may be a panel having a 1DIG stripe structure.

The display 110 may be implemented to display one frame for a first time corresponding to a first scanning rate. For example, the display 110 may display one frame for 1/60s. For example, when the resolution of the display 110 is 7680Y4320, and the scanning rate is 60 Hz, the display 110 may display one frame having a resolution of 7680Y4320 during 1/60s on a display consisting of 7680Y4320 pixels, and when the resolution of the display 110 is 3840Y2160 and the scanning rate is 60 Hz, the display 110 may display one frame having a resolution of 3840Y2160 for 1/60 s on a display consisting of 3840Y2160 pixels.

According to an embodiment, the processor 120 may control the display 110 so that two adjacent gate lines 521, 522 among a plurality of gate lines included in the display 110 are driven simultaneously with respect to the first area.

Figure 6:
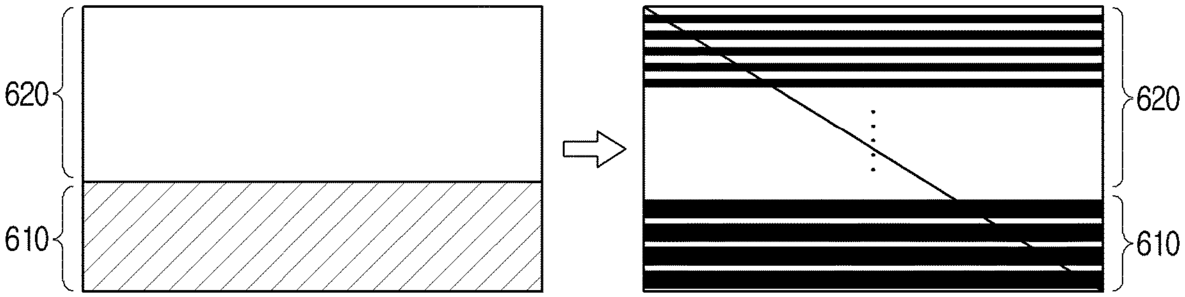
FIG. 6 is a diagram for describing a scanning method according to an embodiment of the disclosure.

FIG. 6 is a diagram for describing a scanning method according to an embodiment of the disclosure.

According to an embodiment, when the processor 120 sets a certain area 610 at a lower end of the screen as the first area, a remaining area 620 may be identified as a second area.

The processor 120 simultaneously drives two adjacent gate lines 521, 522 among a plurality of gate lines included in the display 110 with respect to the first area. Specifically, the processor 120 may simultaneously drive and display two adjacent gate lines 521, 522 among a plurality of gate lines in a frame having a vertical resolution adjusted in the first area.

The processor 120 may drive one gate line with respect to the second area and may display one pixel line only.

In this case, the vertical resolution of the first area decreases to half the vertical resolution of the second area, but since the speed of scanning the first area is twice faster than the speed at which the second area is scanned, the overall scanning rate is increased.

In FIG. 6, two gate lines are simultaneously driven in the first area, but it is also possible to simultaneously drive three or more gate lines according to the user's setting or determination of the processor 120.

The processor 120 may determine how many gate lines are simultaneously driven and displayed in the first area according to the pixel information, the motion information, or the edge information for each area in the first area.

According to an embodiment of the disclosure, when at least one of pixel information, motion information, or edge information for each area in the first area is less than a threshold value, the processor 120 may scan the first area in units of three pixel lines.

The processor 120 may scan the first area in two pixel line units if at least one of the pixel information, motion information, or edge information by areas in the first area is greater than or equal to a threshold value.

The three pixel lines and the two pixel lines as exemplified are merely examples, and it should be understood that the first area may be scanned in a smaller number of pixel line units when at least one of the pixel information, the motion information, or the edge information is greater than or equal to a threshold value than when not being greater than or equal to a threshold value.

According to an embodiment of the disclosure, the overall scanning rate of the display device 100 may be increased without a loss of resolution in an interested area 620 of a user through an increase in a scanning rate in a first area 610 that is a non-interested area of a user.

Figure 7A:
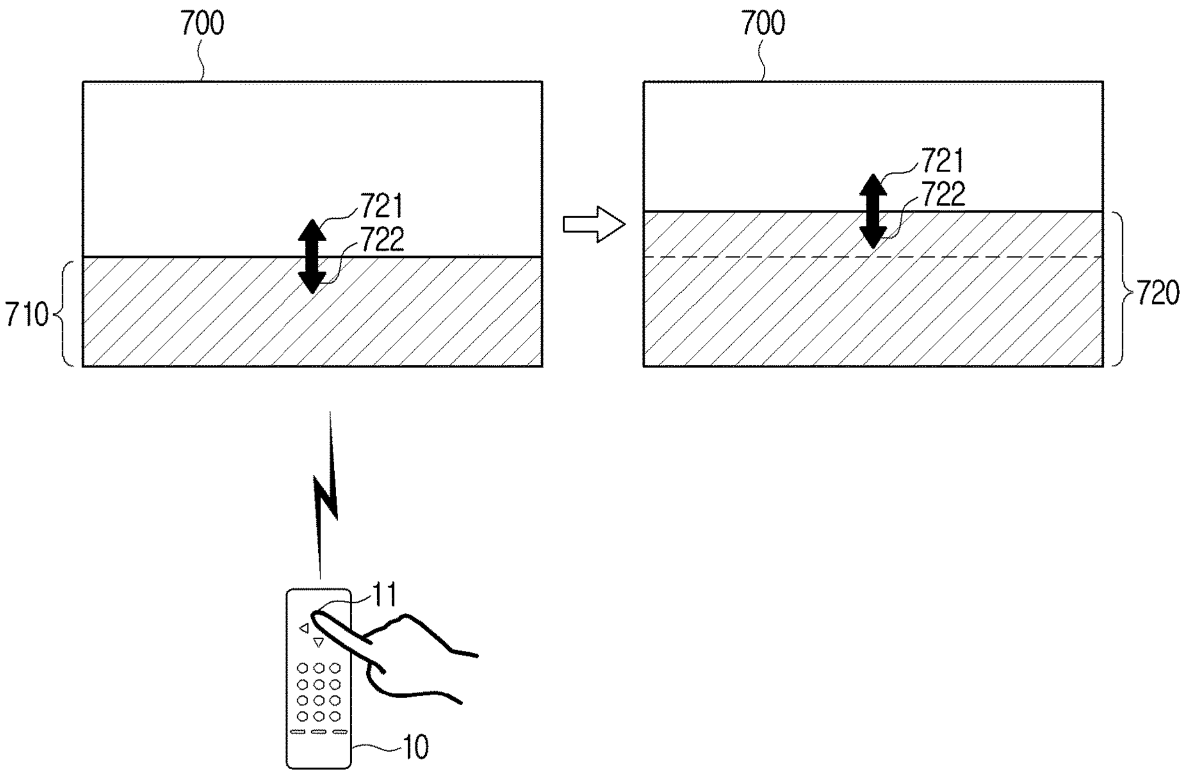
FIGS. 7A and 7B are diagrams for describing a first area designation method according to an embodiment of the disclosure.
Figure 7B:
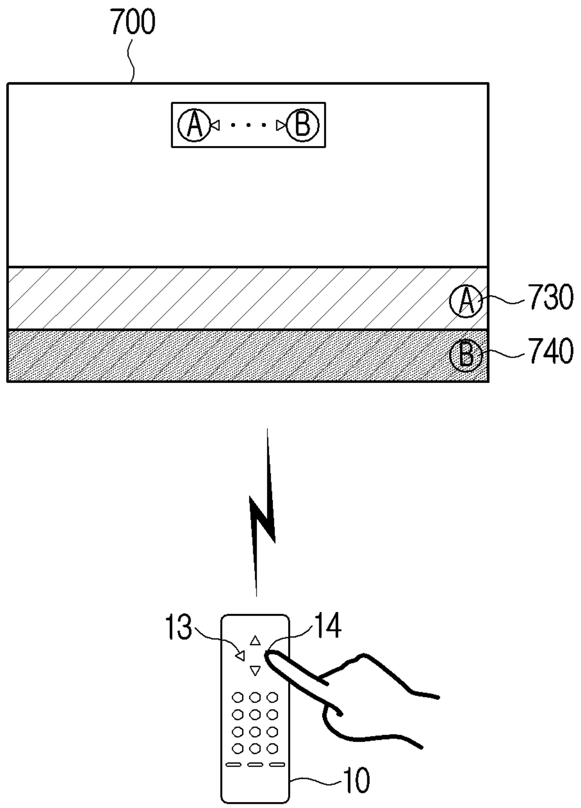

FIGS. 7A-7B are diagrams for describing a first area designation method according to an embodiment of the disclosure.

A user may adjust a range of a first area on a display 700 by using a device such as a remote controller 10. The control means is not necessarily limited to the remote controller 10, and may be performed in various ways such as motion sensing, voice recognition, and screen touch.

Before a user's operation is performed, a first area may be set in a predetermined area 710 at the lower end of the screen. When a user command for adjusting the range of the first area is inputted or selected, the UI is displayed on the screen. The user command may be various forms such as a corresponding menu selection command, a mode entry command, and the like.

According to FIG. 7A, a GUI 721, 722 for guiding adjustment of the size of the first area 710 may be displayed on the screen. In this case, the user may expand or reduce the size of the first area by operating a button provided in the remote controller 10. The button provided in the remote controller 10 may be implemented as an up/down button, but is not limited thereto.

According to an embodiment of the disclosure, the processor 120 may divide the vertical length of the screen 700 by n so as to expand or reduce the vertical length of the first area by an n equally divided length whenever the up button 11 or the down button not shown is operated once. For example, when the up button 11 is operated, the size of the first area 720 may be extended as shown on the right side of FIG. 7A.

According to FIG. 7B, an area 730 indicated as A and an area 740 indicated as B have a predetermined range. This may be a value previously set by a user or stored in a memory of the device at the time of manufacturing.

The user may press a left button 13 of the remote controller 10 according to the UI displayed on the display so as to enable the area 730 of the remote controller 10 to be within the range of the first area, and may press a right button 14 so that the B area 740 may be within the range of the first area.

Through the operation according to an embodiment, a user may have an effect of easily setting the first area suitable for the content which the user frequently uses.

Figure 8:
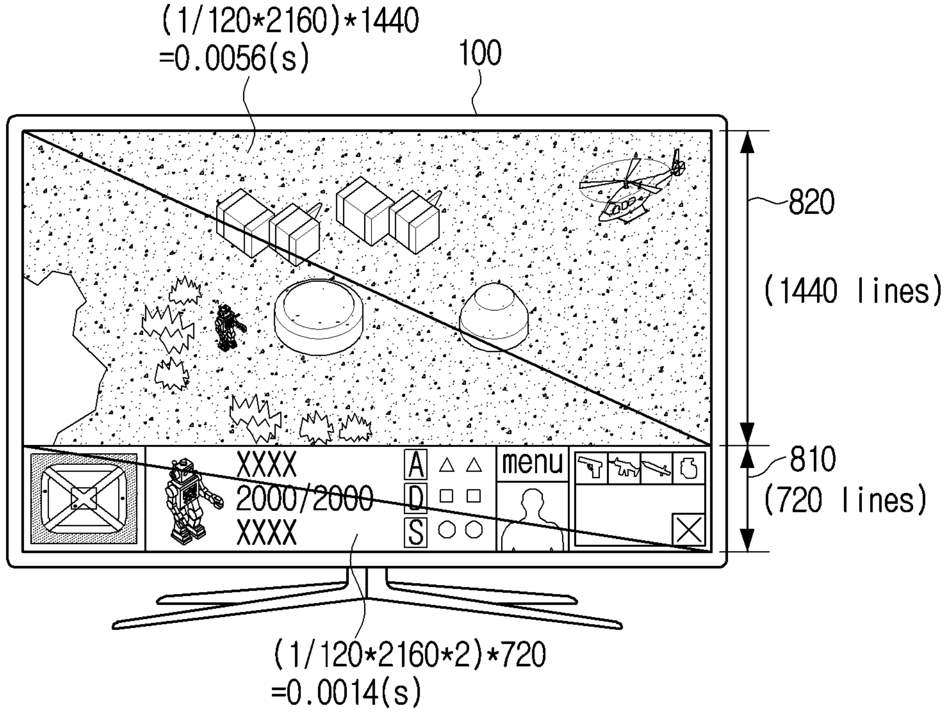
FIG. 8 is a diagram for describing an overall scanning rate increase according to an embodiment of the disclosure.

FIG. 8 is a diagram for describing an overall scanning rate increase according to an embodiment of the disclosure.

According to an embodiment of the disclosure, the processor 120 may set, as a first area, an area 810 having a vertical length of 720 pixel lines on the lower end of a screen, and the other area 820 is identified as a second area.

In the first area, the processor 120 may simultaneously drive two gate lines to display so that two pixel lines have the same data value. Therefore, the scanning time of the first area 810 per unit vertical pixel line is half of the second area 820.

Specifically, when the scanning rate of the device is 120 Hz, the scanning time in the first area 810 is (1/(120*2160*2))*720=0.0014 seconds, and the scanning time in the second area 820 is (1/(120*2160))*1440=0.0056 seconds. Since the sum of the scanning times in the two areas becomes about 0.007 seconds, after the processor 120 performs a scanning rate enhancement process, the scanning rate of the entire screen is improved to about I/O.007=143 Hz. That is, a scanning rate improvement of about 23 Hz is realized without resolution degradation in the main screen area 820.

Figure 9:
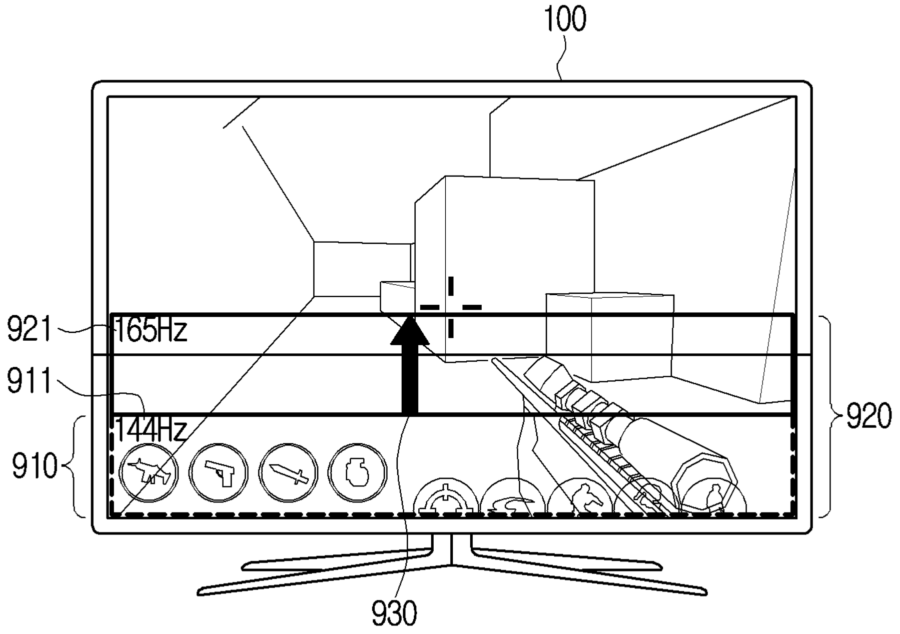
FIG. 9 is a diagram for describing feedback provision according to an embodiment of the disclosure.

FIG. 9 is a diagram for describing feedback provision according to an embodiment of the disclosure.

According to an embodiment, if the size of the first area is adjusted according to a user's manipulation as illustrated in FIG. 7, the display device 100 may provide feedback information corresponding thereto.

For example, when the size of a first area 910 on the lower end of a screen is increased to an upper end by a user operation, a feedback UI 930 indicating that the size of the first area 910 is increased may be provided.

Also, feedback UIs 911, 921 indicating the scanning rate information of the entire screen corresponding to the range of the first area 910 before and after the adjustment of the first area range may be displayed on the screen. Accordingly, the user may intuitively recognize the value of the screen scanning rate increased according to the size of the first area and the increase in the size of the first area according to the manipulation of the first area range.

For example, as shown in FIG. 9, the display device 100 may display, on a screen, a UI 911 indicating that a screen is displayed at a scanning rate of 144 Hz before the user's operation, and display, on the screen, a UI 921 indicating that the screen is displayed at a scanning rate of 165 Hz after the user's operation.

According to an embodiment of the disclosure, a user may adjust the display device 100 at a desired scanning rate on the basis of information provided through the UI, and thus user satisfaction may be improved.

Figure 10:
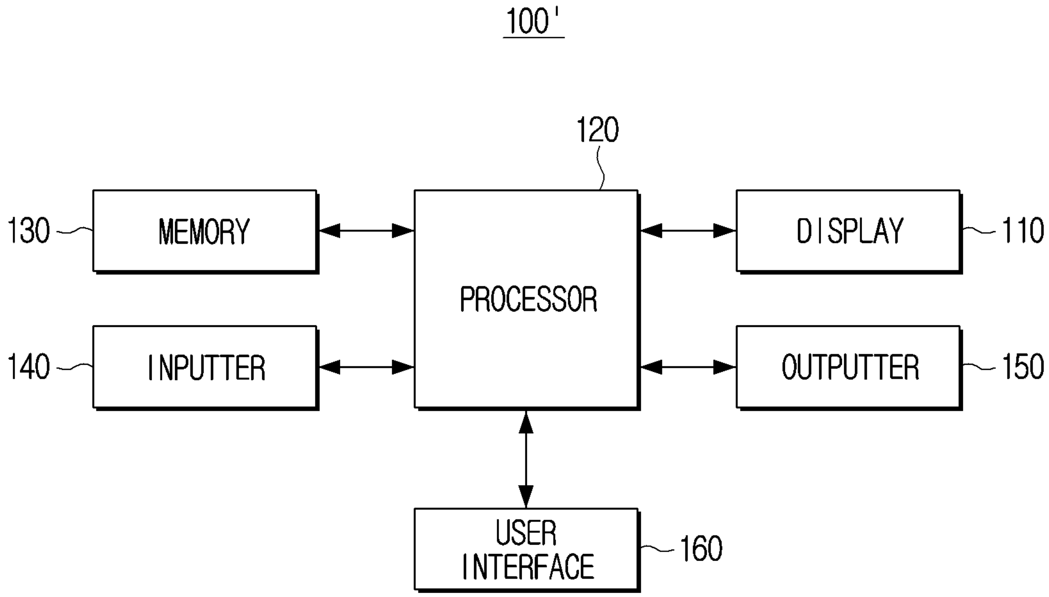
FIG. 10 is a block diagram illustrating a configuration of a display device according to another embodiment of the disclosure.

FIG. 10 is a block diagram illustrating a configuration of a display device according to another embodiment of the disclosure.

Referring to FIG. 10, an electronic device 100' includes the memory 130, the processor 120, an inputter 140, the display 110, an outputter 150, and a user interface 160. Among the configurations illustrated in FIG. 10, a detailed description of a configuration overlapping with the configuration shown in FIG. 2 will be omitted.

The inputter 140 may receive and transmit various types of content. For example, the inputter 140 may receive an image signal from an external device (e.g., source device), external storage medium (e.g., USB memory), external server (e.g., web hard) through communication methods such as an access point (AP)-based wireless fidelity (Wi-Fi) (wireless local area network (WLAN)), Bluetooth, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like. The image signal may be a digital image signal of any one of SD, HD, full HD, ultra HD, but the image signal is not limited thereto.

The display 110 may be implemented as a display including a self-emitting element or a display including a non-self-limiting element and a backlight. For example, the display 110 may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 110, a backlight unit, a driving circuit which may be implemented as an a-si TFT, low temperature poly silicon (LTPS) TFT, organic TFT (OTFT), or the like, may be included as well. The display 110 may be implemented as a touch screen coupled to a touch sensor, a flexible display, a rollable display, a third-dimensional (3D) display, a display in which a plurality of display modules are physically connected, or the like. The processor 120 may control the display 110 to output an output image that is obtained according to various embodiments described above. Here, the output image may be a high-resolution image of 4K, 8K or more.

The outputter 150 outputs a sound signal. For example, the outputter 150 may convert the digital sound signal processed by the processor 120 into an analog sound signal, amplify and output the analog sound signal. For example, the outputter 150 may include, for example, and without limitation, at least one speaker unit, a D/A converter, an audio amplifier, or the like, capable of outputting at least one channel. According to an example, the outputter 150 may be implemented to output various multi-channel sound signals. The processor 120 may control the outputter 150 to process the input sound signal in accordance with the enhanced processing of the input image. For example, the processor 120 may convert an input two-channel sound signal into a virtual multi-channel (e.g., 5.1 channel) sound signal, or may recognize a location on which an electronic device 100" is placed, to process the input two-channel sound signal into a stereophonic sound signal optimized for the space, or provide an optimized sound signal according to the type of the input image (for example, content genre).

The user interface 160 may be implemented using a device such as at least one of a button, a touch pad, a mouse, a keyboard, or a touch screen capable of performing the above-described display function and operation input function, a remote control transceiver, or the like. The remote transceiver may receive a remote control signal from an external remote control device or transmit a remote control signal through at least one communication method among infrared communication, Bluetooth communication, or Wi-Fi communication.

The electronic device 100' may further include at least one of a tuner and a demodulator, according to an implementation example. The tuner (not shown) may receive a radio frequency (RF) broadcast signal by tuning a channel selected by a user or all the prestored channels, among the RF broadcast signal received through an antenna. The demodulator (not shown) may receive and demodulate a digital intermediate frequency (DIF) signal converted by the tuner and perform channel decoding, or the like. The input image received through the tuner according to an embodiment may be processed through a demodulator (not shown) and then may be provided to the processor 120 for image processing.

Figure 11:
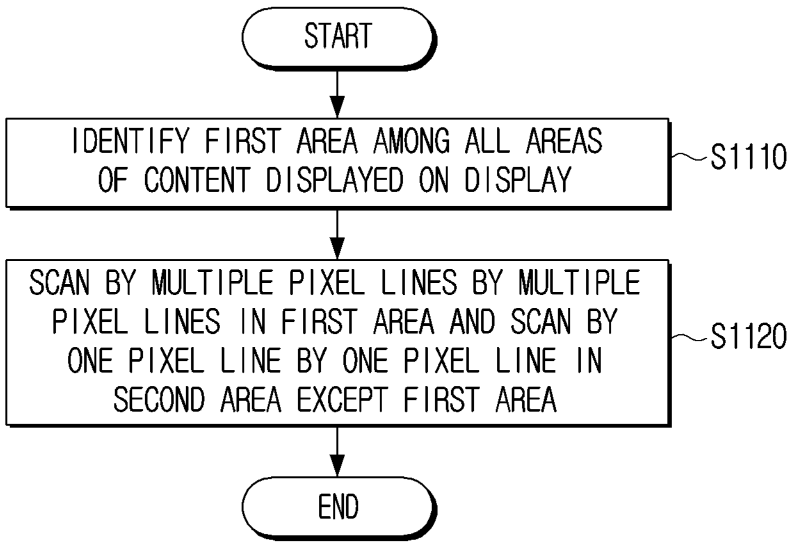
FIG. 11 is a flowchart for describing a method for controlling a display according to an embodiment of the disclosure.

FIG. 11 is a flowchart for describing a method for controlling a display according to an embodiment of the disclosure.

A control method of a display device according to an embodiment includes identifying a first area among all areas of a content displayed on a display in operation S1110.

The method may include performing scanning multiple pixel lines by multiple pixel lines in the first area, and performing scanning one pixel line by one pixel line in a second area remaining after excluding the first area in operation S1120. The at least one of a size, a position, and a number of the first area is variable.

The method may further include displaying a guide user interface (UI) to designate the first area; and changing at least one of the size, position, or number of the first area according to a user manipulation input through the guide UI.

The identifying the first area in operation S1110 may include setting at least one of the size, position, or number of the first area by analyzing features of a plurality of frames included in the content.

The features of a plurality of frames may include at least one of pixel information, motion information, or edge information by areas in each frame.

The scanning in operation S1120 may include, based on at least one of pixel information, motion information, or edge information by areas in the first area being less than a threshold value, scanning the first area by a unit of a plurality of first pixel lines, and based on at least one of pixel information, motion information, or edge information by areas in the first area being greater than or equal to a threshold value, scanning the first area by a unit of a plurality of second pixel lines less than the first pixel lines.

The metadata related to the content may include area information defining at least one of size, position, or number of the first area, and the identifying the first area in operation S1110 may include automatically setting at least one of the size, position, or number of the first area based on the area information.

The metadata related to the content may include type information of the content. The identifying the first area in operation S1110 may include automatically setting at least one of the size, position, or number of the first area based on the type information of the content.

The display may include a plurality of pixel lines. The scanning in operation S1120 may include providing same data to at least two adjacent pixel lines among a plurality of pixel lines included in the first area.

Each step has been described in detail in the description of the other drawings described above. In addition, the above-described control method may be implemented in a display device having the configuration of FIGS. 1 and 10, but is not necessarily limited thereto, and may also be implemented by a display device having another configuration.

Particularly, as the recent content is manufactured with high resolution, the image quality that a user feels may not be significantly deteriorated even when the vertical resolution of the content is reduced, and a response characteristic may be improved, thereby outputting a smoother image.

According to various embodiments of the disclosure described above, content requiring fast screen conversion may be provided without loss of resolution for an interested area of a user.

According to an embodiment, the various embodiments as described above may be implemented with software including instructions stored in the machine-readable storage media readable by a machine (e.g., computer). The apparatus may be an apparatus which may call instructions from the storage medium and operates according to the called instructions, and may include an electronic apparatus (e.g., electronic apparatus (A)) in accordance with the disclosed embodiments. When an instruction is executed by a processor, the processor may perform functions corresponding to the instruction, either directly or under the control of the processor, using other components. The instructions may include a code generated or executed by the compiler or interpreter. A machine-readable storage medium may be provided in the form of a non-transitory storage medium. Here, "non-transitory" means that the storage medium does not include a signal and is tangible, but does not distinguish whether data is stored semi-permanently or temporarily on the storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily or at least temporarily in a storage medium such as a manufacturer's server, a server of an application store, or a memory of a relay server.

According to an embodiment, the various embodiments described above may be implemented in a recordable medium which is readable by computer or a device similar to computer using software, hardware, or the combination of software and hardware. In some cases, embodiments described herein may be implemented by the processor itself. According to a software implementation, embodiments such as the procedures and functions described herein may be implemented with separate software modules. Each of the above-described software modules may perform one or more of the functions and operations described herein.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

Each of the elements (for example, a module or a program) according to various embodiments may be composed of a single entity or a plurality of entities, and some subelements of the abovementioned subelements may be omitted, the elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order.

While the preferred embodiments have been shown and described, the disclosure is not limited to the specific embodiments, and it is to be understood that the disclosure is not limited to the specific embodiments as described above, it will be understood by those of ordinary skill in the art that various changes in form and details may be made therein without departing from the spirit and scope as defined by the following claims and their equivalents.

What is claimed is:

1. A display device comprising:

a display; and a processor configured to:

scan multiple adjacent pixel lines by multiple adjacent pixel lines of all pixel lines in a first area among all areas of content displayable on the display, and scan one pixel line by one pixel line in a second area among all the areas of content which remain after excluding the first area, wherein the processor is further configured to:

set at least one of a size, a position, or a number of the first area by analyzing features of a plurality of frames included in the content, based on at least one of pixel information, motion information, or edge information by areas in the first area being less than a threshold value, the first area is scanned by a unit of a plurality of first pixel lines among the multiple adjacent pixel lines in the first area, and based on at least one of pixel information, motion information, or edge information by areas in the first area being greater than or equal to a threshold value, the first area is scanned by a unit of a plurality of second pixel lines among the multiple adjacent pixel lines in the first area which is less than the plurality of first pixel lines.

2. The display device of claim 1, wherein at least one of a size, a position, and a number of the first area is variable.

3. The display device of claim 1, wherein the processor is further configured to:

control the display to display a guide user interface (UI) to designate the first area, and control the display to change at least one of a size, a position, or a number of the first area according to a user manipulation input through the guide UI.

4. The display device of claim 1, wherein features of a plurality of frames included in the content comprise at least one of pixel information, motion information, or edge information by areas in each frame.

5. The display device of claim 1, wherein metadata related to the content comprises area information defining at least one of a size, position, or a number of the first area, and wherein the processor is further configured to automatically set at least one of the size, the position, or the number of the first area based on the area information.

6. The display device of claim 1, wherein metadata related to the content comprises type information of the content, and wherein the processor is further configured to automatically set at least one of a size, a position, or a number of the first area based on the type information of the content.

7. The display device of claim 1, wherein the first area comprises an area comprising at least one of a preset type graphical user interface, on screen display, or an object, or an area comprising a script.

8. The display device of claim 1, wherein the display comprises a plurality of pixel lines, and wherein the processor is further configured to provide same data to at least two adjacent pixel lines among a plurality of adjacent pixel lines included in the first area.

9. The display device of claim 8, wherein the display comprises a plurality of gate lines, a plurality of data lines, and a timing controller, and wherein the processor is further configured to:

select two adjacent gate lines among the plurality of gate lines in the first area, and control the timing controller to provide same data to the two adjacent gate lines through the plurality of data lines.

10. A method of controlling a display device, comprising:

identifying a first area among all areas of a content displayable on a display; and scanning multiple adjacent pixel lines by multiple adjacent pixel lines of all pixel lines in the first area, and scanning one pixel line by one pixel line in a second area among all the areas of content which remain after excluding the first area, wherein at least one of a size, a position, or a number of the first area is set by analyzing features of a plurality of frames included in the content, based on at least one of pixel information, motion information, or edge information by areas in the first area being less than a threshold value, the first area is scanned by a unit of a plurality of first pixel lines among the multiple adjacent pixel lines in the first area, and based on at least one of pixel information, motion information, or edge information by areas in the first area being greater than or equal to a threshold value, the first area is scanned by a unit of a plurality of second pixel lines among the multiple adjacent pixel lines in the first area which is less than the plurality of first pixel lines.

11. The method of claim 10, wherein at least one of a size, a position, and a number of the first area is variable.

12. The method of claim 10, further comprising:

displaying a guide user interface (UI) to designate the first area; and changing at least one of a size, a position, or a number of the first area according to a user manipulation input through the guide UI.

13. The method of claim 10, wherein the identifying the first area comprises:

setting at least one of a size, a position, or a number of the first area by analyzing features of a plurality of frames included in the content.

* * * * *